US012512620B2

(12) United States Patent
Nagai et al.

(10) Patent No.: US 12,512,620 B2
(45) Date of Patent: Dec. 30, 2025

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tomoyuki Nagai, Mie (JP); Akihiro Nishitani, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 301 days.

(21) Appl. No.: 18/280,430

(22) PCT Filed: Feb. 15, 2022

(86) PCT No.: PCT/JP2022/005782
§ 371 (c)(1),
(2) Date: Sep. 5, 2023

(87) PCT Pub. No.: WO2022/190782
PCT Pub. Date: Sep. 15, 2022

(65) Prior Publication Data

US 2024/0154352 A1 May 9, 2024

(30) Foreign Application Priority Data

Mar. 8, 2021 (JP) ................................ 2021-036040

(51) Int. Cl.
*H01R 13/506* (2006.01)
*H01R 13/639* (2006.01)

(52) U.S. Cl.
CPC ......... *H01R 13/506* (2013.01); *H01R 13/639* (2013.01)

(58) Field of Classification Search
None
See application file for complete search history.

(56) References Cited

U.S. PATENT DOCUMENTS 6,217,365 B1 * 4/2001 Shinozaki .......... H01R 13/6272 439/484
9,893,462 B2 * 2/2018 Hashimoto ............. H01R 11/11
(Continued)

FOREIGN PATENT DOCUMENTS

JP 2004-311392 A 11/2004
JP 2005-174817 A 6/2005
(Continued)

OTHER PUBLICATIONS

International Search Report issued on Mar. 22, 2022 for WO 2022/190782 A1 (5 pages).

*Primary Examiner* — Tho D Ta
(74) *Attorney, Agent, or Firm* — Venjuris, P.C.

(57) ABSTRACT

It is aimed to prevent a resilient displacement of a lock arm from being hindered while achieving a height reduction. A connector (A) is provided with a connector housing (20) and a lock arm (25) extending rearward along an outer surface of the connector housing (20). A deflection allowance space (30) for enabling the lock arm (25) to be resiliently displaced in a direction approaching the outer surface of the connector housing (20) is provided between the outer surface of the connector housing (20) and the lock arm (25). The connector housing (20) is formed with a covering portion (36) for covering the lock arm (25) from behind by projecting from the outer surface of the connector housing (20).

6 Claims, 7 Drawing Sheets

(56) References Cited

U.S. PATENT DOCUMENTS

| | | | | |
|---|---|---|---|---|
| 9,929,506 | B2 * | 3/2018 | Hashimoto .......... | H01R 13/533 |
| 2017/0222356 | A1 | 8/2017 | Hashimoto et al. | |
| 2020/0321726 | A1 | 10/2020 | Ikeya et al. | |

FOREIGN PATENT DOCUMENTS

| | | | |
|---|---|---|---|
| JP | 2013-030381 | A | 2/2013 |
| JP | 2014-186810 | A | 10/2014 |
| WO | 2015/166966 | A1 | 11/2015 |

* cited by examiner

CONNECTOR

CROSS REFERENCE TO RELATED APPLICATIONS

This application is a national phase of PCT application No. PCT/JP2022/005782, filed on 15 Feb. 2022, which claims priority from Japanese patent application No. 2021-036040, filed on 8 Mar. 2021, all of which are incorporated herein by reference.

TECHNICAL FIELD

The present disclosure relates to a connector.

BACKGROUND

Patent Document 1 discloses a structure for forming a locking projection on a lock arm and forming a turn-up preventing projection to be locked to the locking projection on a protection wall of a housing body as a means for preventing the lock arm from being turned up in an unintended direction.

PRIOR ART DOCUMENT

Patent Document

Patent Document 1: JP 2020-173909 A

SUMMARY OF THE INVENTION

Problems to be Solved

According to the above structure, the turn-up of the lock arm can be prevented, but a space between the outer surface of the housing body and the lock arm is open to outside. This space between the outer surface of the housing body and the lock arm is a deflection allowance space for resiliently displacing the lock arm in a connection process of a connector or at the time of unlocking. If an external matter enters this deflection allowance space, a proper resilient displacement of the lock arm is hindered.

As a countermeasure against this, it is considered to prevent the intrusion of an external matter into the deflection allowance space by forming an arch portion to cover the lock arm. However, since the arch portion is arranged on the outer surface side of the lock arm in this method, there is a problem that the connector becomes bulky.

A connector of the present disclosure was completed on the basis of the above situation and aims to prevent a resilient displacement of a lock arm from being hindered while achieving a height reduction.

Means to Solve the Problem

The present disclosure is directed to a connector with a connector housing and a lock arm shaped to extend rearward along an outer surface of the connector housing, a deflection allowance space for enabling the lock arm to be resiliently displaced in a direction approaching the outer surface of the connector housing being provided between the outer surface of the connector housing and the lock arm, and the connector housing being formed with a covering portion for covering the lock arm from behind by projecting from the outer surface of the connector housing.

Effect of the Invention

According to the present disclosure, it is possible to prevent a resilient displacement of a lock arm from being hindered while achieving a height reduction.

DETAILED DESCRIPTION TO EXECUTE THE INVENTION

Description of Embodiments of Present Disclosure

Figure 1:
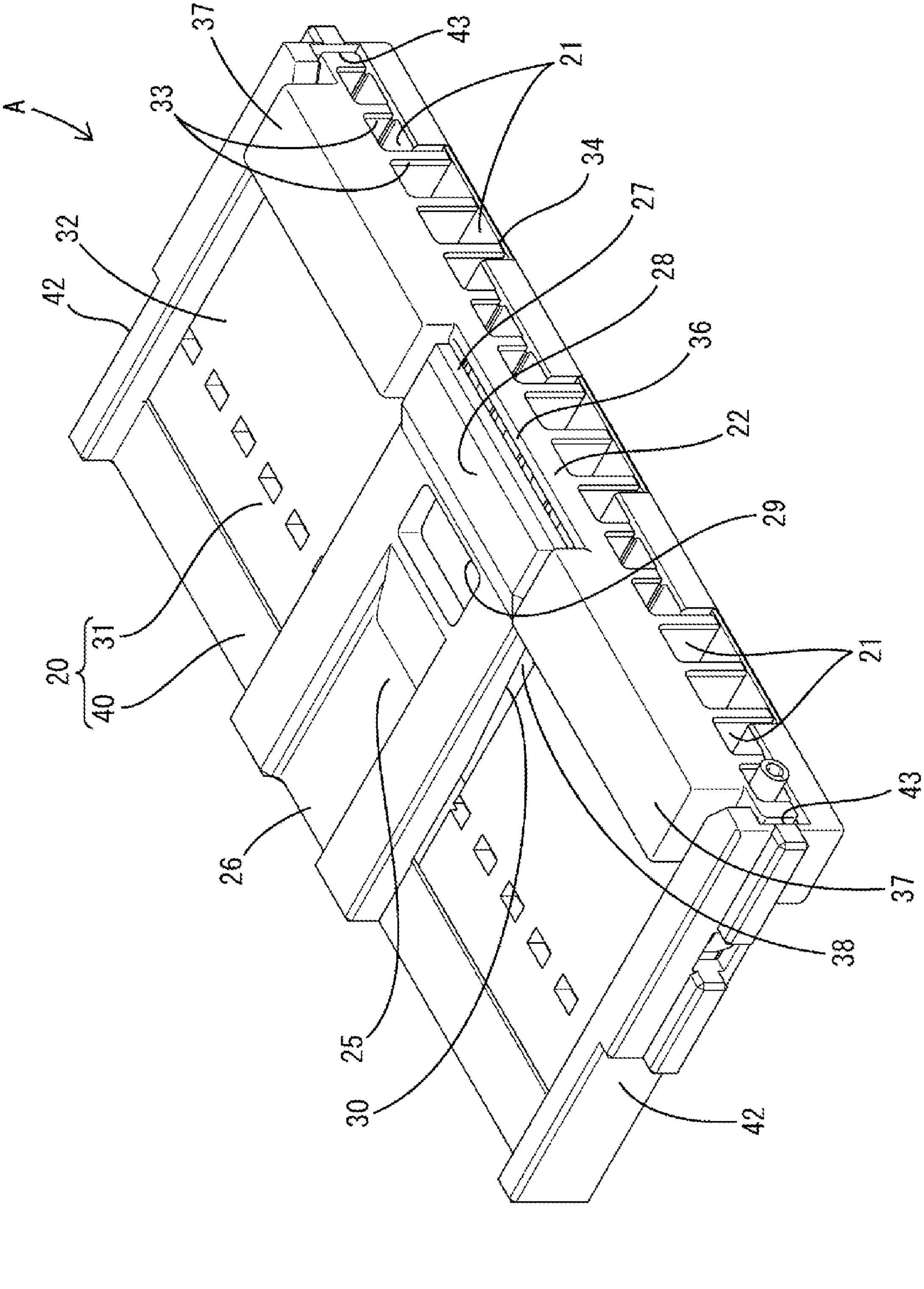
FIG. 1 is a perspective view of a connector of a first embodiment.

First, embodiments of the present disclosure are listed and described.

(1) The connector of the present disclosure is provided with a connector housing and a lock arm shaped to extend rearward along an outer surface of the connector housing, a deflection allowance space for enabling the lock arm to be resiliently displaced in a direction approaching the outer surface of the connector housing being provided between the outer surface of the connector housing and the lock arm, and the connector housing being formed with a covering portion for covering the lock arm from behind by projecting from the outer surface of the connector housing. According to the configuration of the present disclosure, it can be prevented by the covering portion that an external matter is stuck in the deflection allowance space between the outer surface of the connector housing and the lock arm. The covering portion is arranged not to cover the outer surface of the lock arm, but to cover the deflection allowance space from behind the lock arm. Thus, the connector housing does not become bulky. Therefore, according to the connector of the present disclosure, it can be prevented that a resilient displacement of the lock arm is hindered while a height reduction is achieved.

(2) Preferably, an operating portion is formed on a rear end part of the lock arm, and an operation surface of the operating portion is located further in a projecting direction than a projecting end of the covering portion when a resilient displacement amount of the lock arm is maximum. According to this configuration, when the operation surface of the operating portion is pushed, the covering portion does not obstruct the operation. Further, enlargement due to the formation of the covering portion is avoided.

(3) Preferably, protrusions arranged to sandwich a rear end part of the lock arm in a lateral direction are formed on the outer surface of the connector housing. According to this configuration, the intrusion of an external matter into the deflection allowance space from the lateral direction can be prevented by the protrusions.

(4) Preferably, in (3), the protrusions and the covering portion are directly connected. According to this configuration, the deformation of the covering portion can be prevented even if the covering portion is plate-like.

(5) Preferably, an outer plate portion constituting the outer surface of the connector housing is formed with a recess constituting a part of the deflection allowance space. According to this configuration, since a part of the deflection allowance space necessary for the resilient displacement of the lock arm is secured within a thickness range of the outer plate portion of the connector housing, a height reduction can be realized.

(6) Preferably, the connector housing is configured by assembling an inner housing formed with a terminal accommodation chamber for accommodating a terminal fitting and an outer housing for closing an opening of the terminal accommodation chamber in an outer surface of the inner housing, the lock arm is formed on the outer housing, and the covering portion is formed on the inner housing. According to this configuration, since the lock arm and the covering portion are separately formed on the outer housing and the inner housing, which are mutually different components, the structures of a mold for the outer housing and a mold for the inner housing are simplified. A degree of freedom in designing the lock arm and the covering portion is high even without complicating the mold structures.

(7) Preferably, in (6), the inner housing includes an outer plate portion constituting the outer surface of the connector housing and a separation wall portion projecting from the outer plate portion and partitioning between adjacent ones of the terminal accommodation chambers, the outer housing includes a closing plate portion for closing the openings of the terminal accommodation chambers, and the lock arm is arranged to overlap an outer surface of the outer plate portion and sandwich the inner housing between the closing plate portion and the lock arm. According to this configuration, the inner housing and the outer housing can be prevented from being relatively displaced away from each other by sandwiching the inner housing between the closing plate portion and the lock arm.

(8) Preferably, in (7), a region not overlapping the lock arm, out of the outer plate portion, is exposed on the outer surface of the connector housing. According to this configuration, since no plate portion constituting the outer housing is interposed between the outer surface of the outer plate portion and the lock arm, a height reduction can be realized.

DETAILS OF EMBODIMENT OF PRESENT DISCLOSURE

First Embodiment

Figure 3:
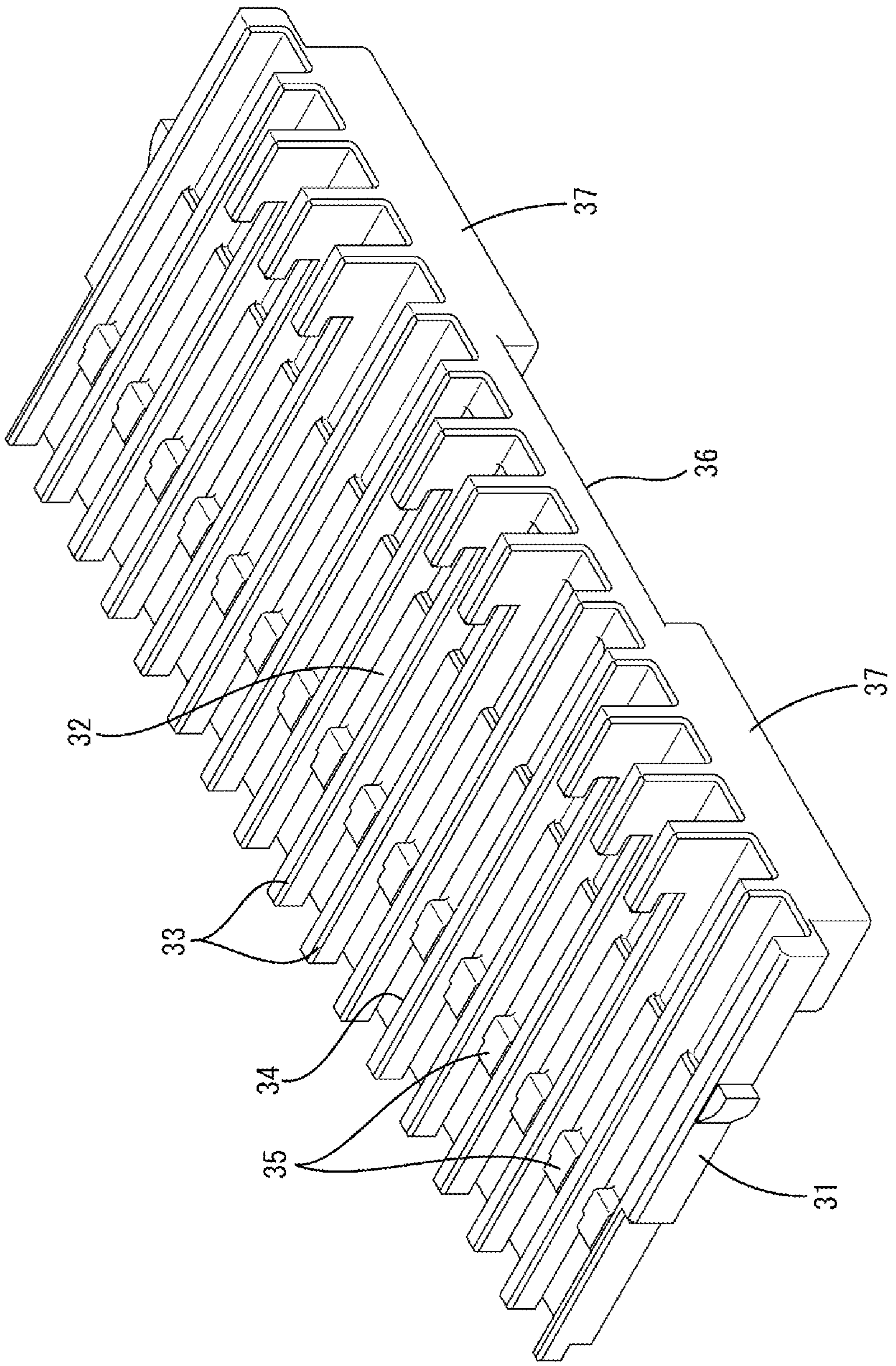
FIG. 3 is a perspective view of the inner housing in a vertically inverted state.
Figure 4:
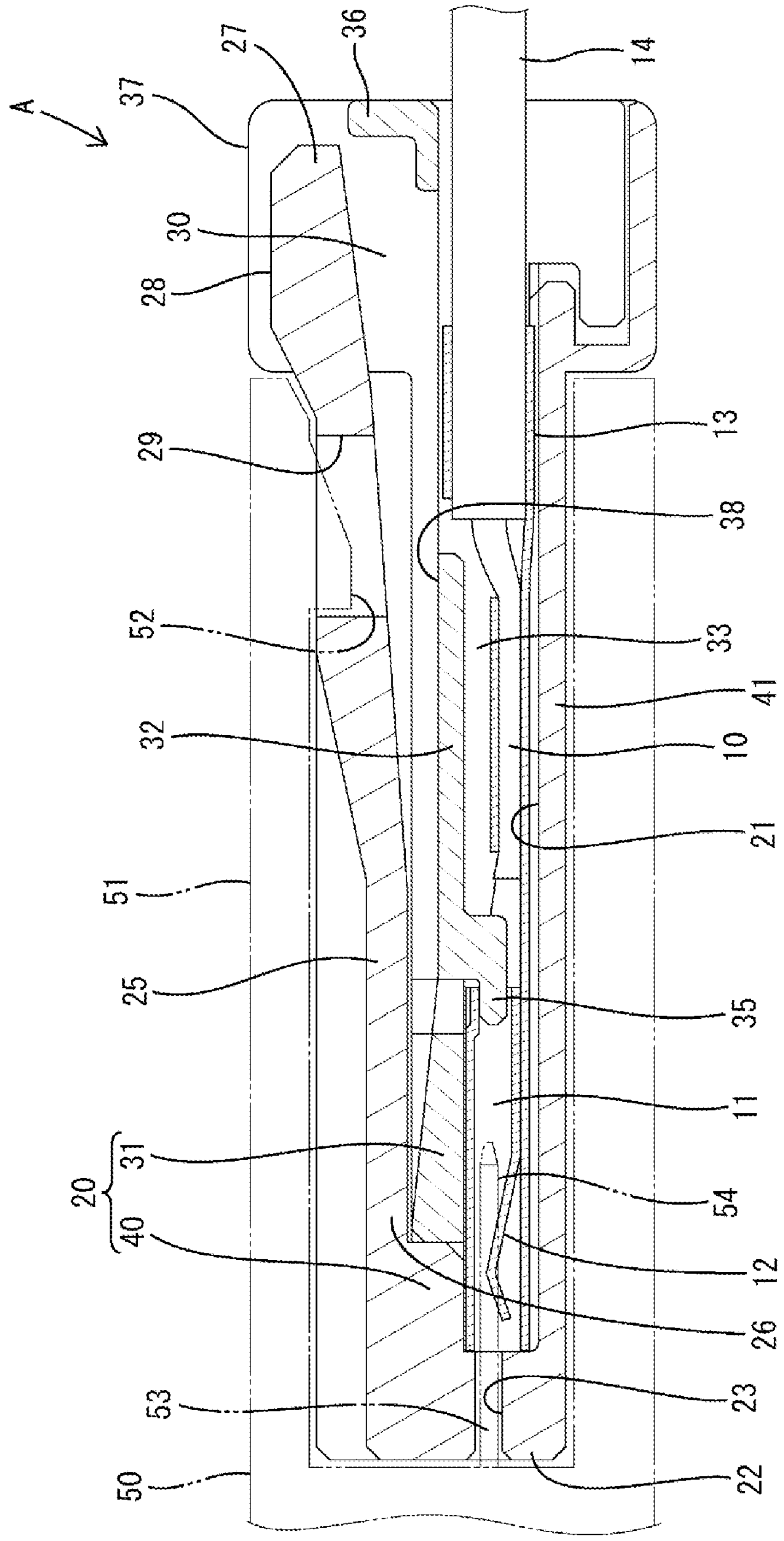
FIG. 4 is a side view in section of the connector showing a state where a lock arm is not resiliently displaced.
Figure 5:
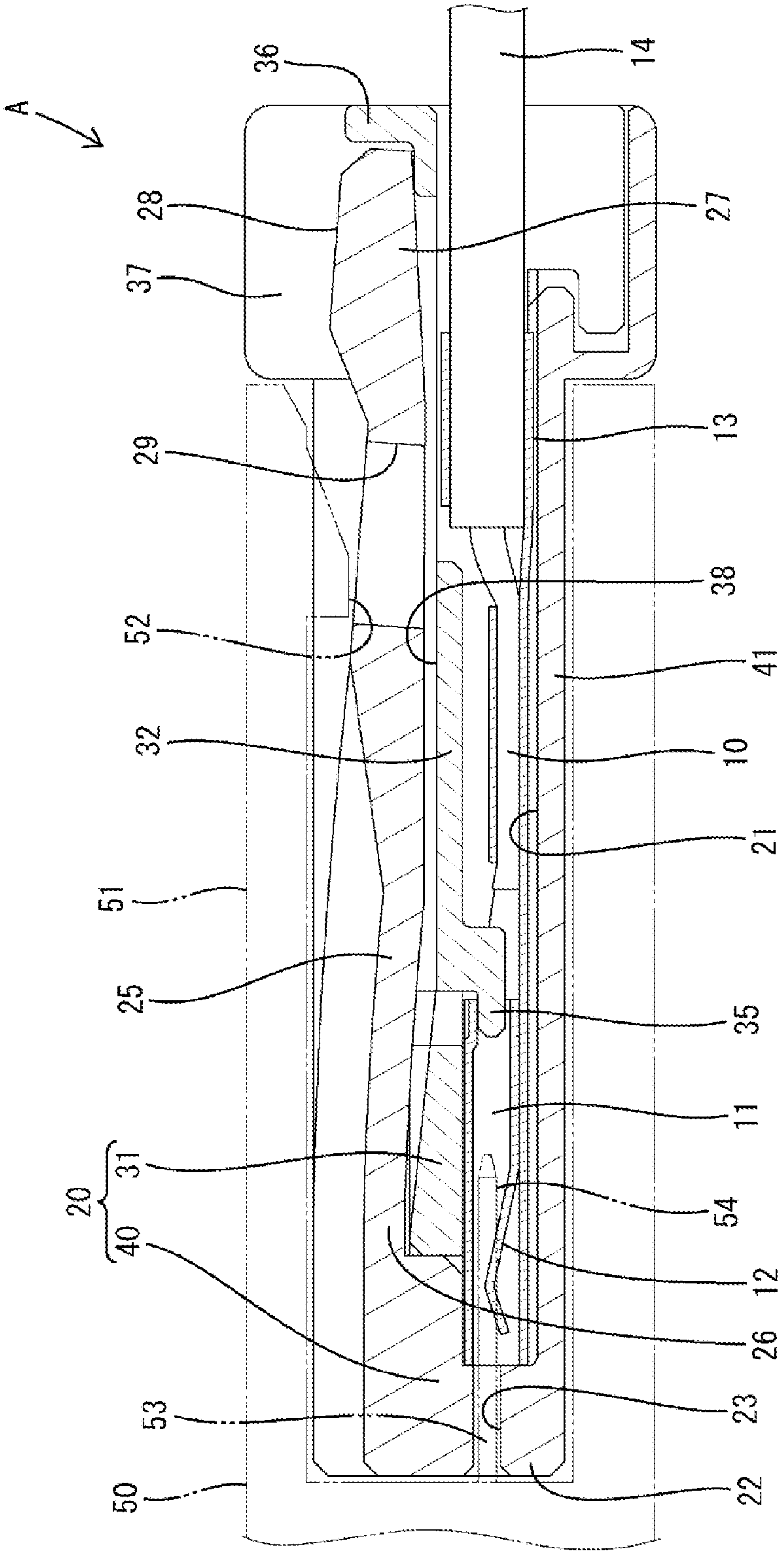
FIG. 5 is a side view in section of the connector in a state where the lock arm is resiliently displaced.

A first specific embodiment of a connector of the present disclosure is described below with reference to FIGS. 1 to 6. Note that the present invention is not limited to these illustrations, but is represented by claims and intended to include all changes in the scope of claims and in the meaning and scope of equivalents. In the first embodiment, an oblique left-upper side in FIGS. 1 to 3 and a left side in FIGS. 4 and 5 are defined as a front side concerning a front-rear direction. Upper and lower sides shown in FIGS. 1 to 6 are directly defined as upper and lower sides concerning a vertical direction. The vertical direction and a height direction are used as synonyms. A lateral direction and a width direction are used as synonyms.

A connector A of this embodiment is provided with a plurality of terminal fittings 10 and one connector housing 20. The terminal fitting 10 is a female terminal having a shape elongated in the front-rear direction. As shown in FIGS. 4 and 5, a terminal body portion 11 in the form of a rectangular tube open on both front and rear ends is formed in a front end part of the terminal fitting 10. A resilient contact piece 12 is accommodated in the terminal body portion 11. A crimping portion 13 in the form of an open barrel is formed in a rear end part of the terminal fitting 10. The crimping portion 13 is fixed to a front end part of a wire 14. The terminal fitting 10 and the front end part of the wire 14 are arranged one behind the other. The wire 14 extends rearward from the rear end of the terminal fitting 10.

The connector housing 20 is configured by assembling an inner housing 31 made of synthetic resin and an outer housing 40 likewise made of synthetic resin. As shown in FIG. 1, the connector housing 20 has a flat rectangular parallelepiped shape as a whole. That is, a vertical dimension of the connector housing 20 is smaller than dimensions in the front-rear direction and width direction of the connector housing 20.

Figure 6:
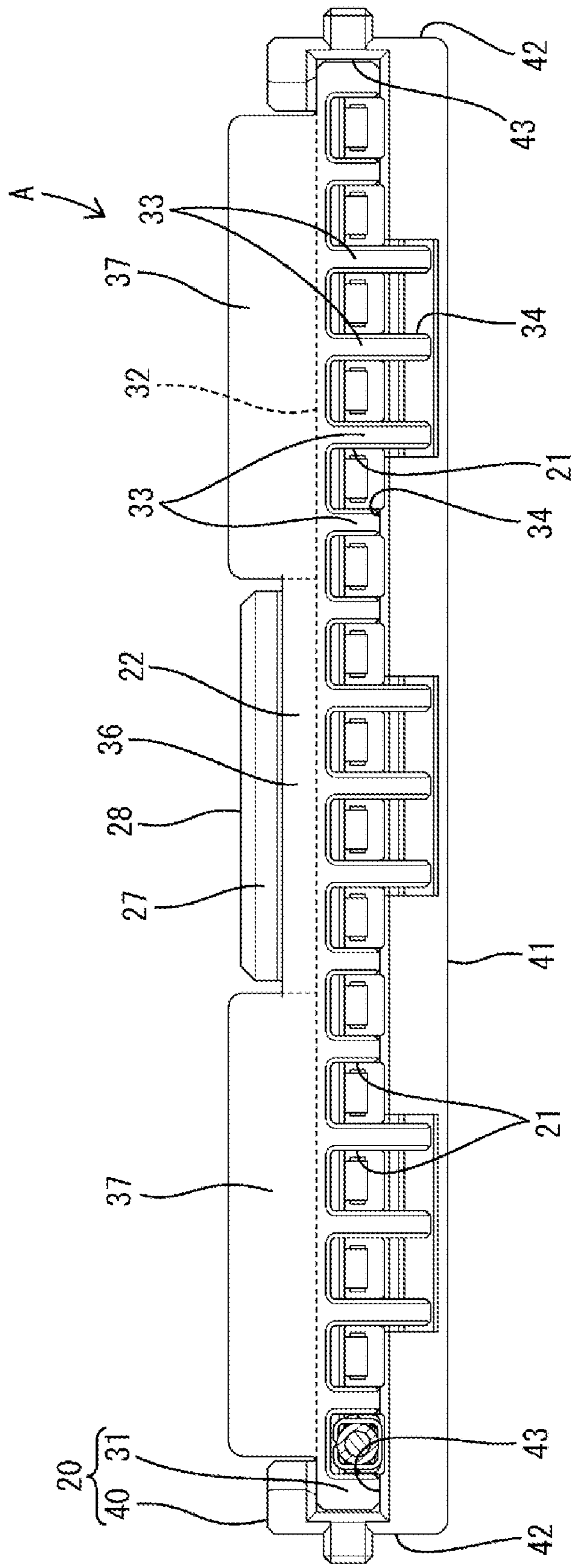
FIG. 6 is a back view of the connector.

As shown in FIGS. 4 and 5, a plurality of terminal accommodation chambers 21 elongated in the front-rear direction are formed in the connector housing 20. As shown in FIGS. 1 and 6, the plurality of terminal accommodation chambers 21 are arranged in parallel at fixed intervals in the width direction. The connector housing 20 includes a front wall portion 22 defining the front ends of the terminal accommodation chambers 21 and partitioning between the insides of the terminal accommodation chambers 21 and the outside of the connector housing 20. The front wall portion 22 is formed with a plurality of insertion holes 23 for allowing the respective terminal accommodation chambers 21 to individually communicate with the outside of the connector housing 20.

As shown in FIGS. 4 and 5, the connector housing 20 is fit into a receptacle 51 of a mating connector 50. A lock projection 52 is formed on an upper wall portion of the receptacle 51. The mating connector 50 includes male terminals 53. The male terminal 53 is connected to the terminal fitting 10. A tab 54 of the male terminal 53 is accommodated in the receptacle 51. In the first embodiment, a fitting direction of the connector housing 20 into the receptacle 51 is defined as a forward direction.

The connector housing 20 is formed with a lock arm 25 for holding the connector housing 20 fit in the receptacle 51. A supporting portion 26 on the front end part of the lock arm 25 is connected to the front end of a widthwise central part of the connector housing 20. The lock arm 25 is a plate-like part cantilevered rearward from the supporting portion 26 along the upper surface, i.e. the outer surface, of the connector housing 20. An extending direction of the lock arm 25 is opposite to the fitting direction of the connector housing 20 into the mating connector 50.

An operating portion 27 is formed on a rear end part of the lock arm 25, i.e. on a tip part in the extending direction from the supporting portion 26. The upper surface of the operating portion 27 functions as an operation surface 28. A lock hole 29 is formed at a position forward of the operating portion 27 in the lock arm 25. The lock arm 25 can be resiliently displaced in the vertical direction toward and away from the upper surface of the connector housing 20 with the supporting portion 26 as a fulcrum. If the operation surface 28 is pushed, the lock arm 25 is resiliently displaced in a direction approaching the upper surface of the connector housing 20. As shown in FIG. 4, a space between the upper surface of the connector housing 20 and the lower surface of the lock arm 25 functions as a deflection allowance space 30 for allowing the lock arm 25 to be resiliently displaced in the direction approaching the connector housing 20.

The inner housing 31 is a single component including an outer plate portion 32 having a rectangular plan view shape when the inner housing 31 is viewed from above and a plurality of separation wall portions 33 projecting downward from the lower surface of the outer plate portion 32. The upper surface of the outer plate portion 32 constitutes the upper surface of the connector housing 20. The outer plate portion 32 and the plurality of separation wall portions 33 constitute the plurality of terminal accommodation chambers 21. As shown in FIG. 3 showing the vertically inverted inner housing 31, the plurality of separation wall portions 33 are elongated in the front-rear direction and arranged at fixed intervals in the width direction. The separation wall portion 33 partitions between the terminal accommodation chambers 21 adjacent in the width direction.

Figure 2:
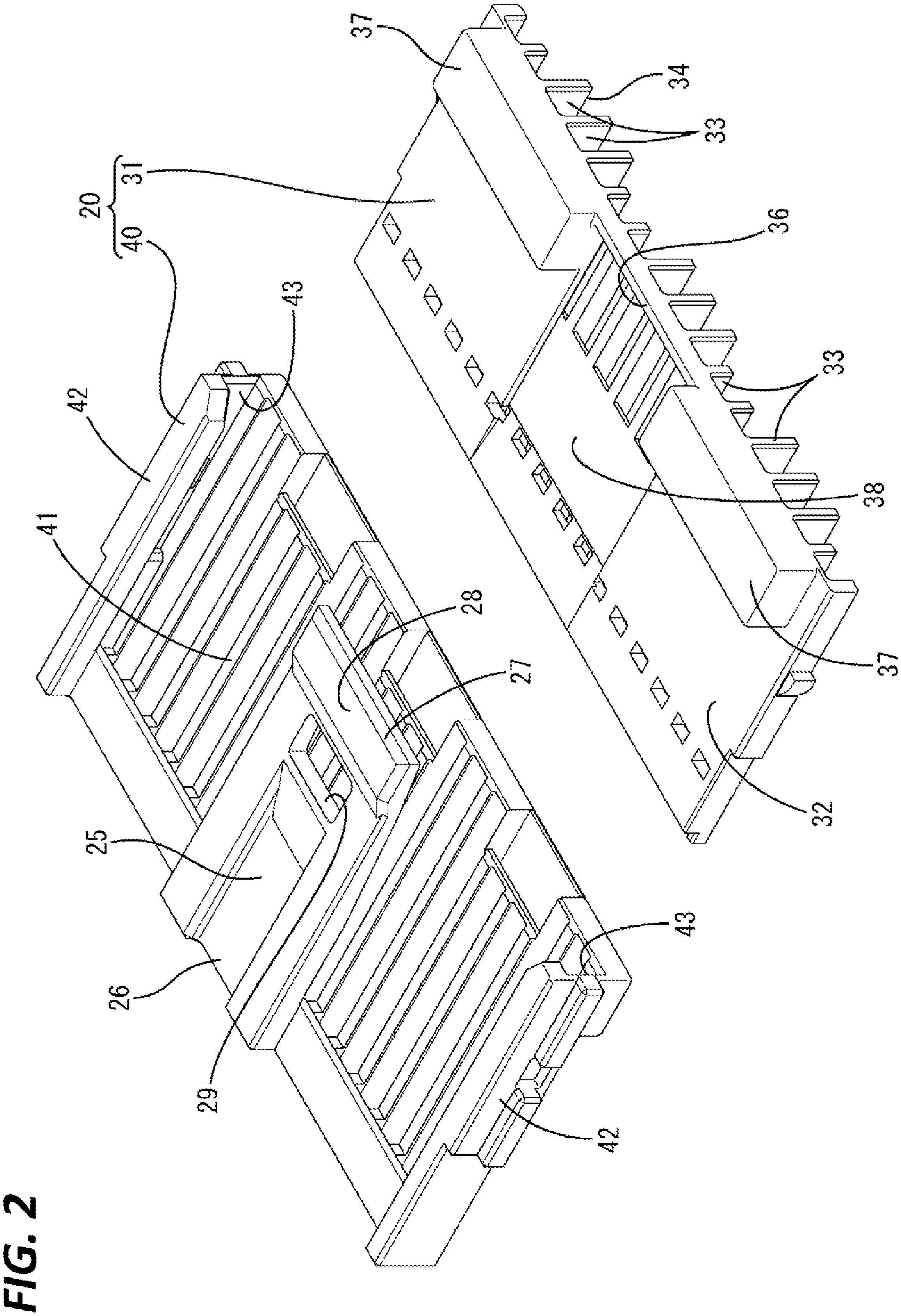
FIG. 2 is a perspective view showing a state where a connector housing is separated into an inner housing and an outer housing.

As shown in FIG. 2, a plurality of openings 34 for allowing the respective terminal accommodation chambers 21 to communicate with outside below the inner housing 31 are formed in the lower surface of the inner housing 25. As shown in FIGS. 4 and 5, a retaining portion 35 projecting from the lower surface of the outer plate portion 32 is formed in each terminal accommodation chamber 21. The retaining portion 35 is rigid to such an extent as not to be deflected or deformed with respect to the outer plate portion 32 and the separation wall portions 33.

As shown in FIGS. 2 and 4 to 6, the inner housing 31 is integrally formed with a covering portion 36. The covering portion 36 is arranged in a widthwise central part of the upper surface, i.e. the outer surface, of the outer plate portion 32 and rises upward from a rear end edge part of the upper surface of the outer plate portion 32. The covering portion 36 is in the form of a wall or plate having a thickness direction oriented in the front-rear direction and elongated in the lateral direction. The rear surface of the covering portion 36 and the rear end surface of the outer plate portion 32 are connected flush with each other. A formation region of the covering portion 36 in the width direction is a range including at least a formation region of the lock arm 25. A width of the covering portion 36 is slightly larger than that of the lock arm 25.

As shown in FIG. 4, in a state where the lock arm 25 is not resiliently displaced, a dimension in the vertical direction from the upper surface of the connector housing 20 to the operation surface 28 is larger than a projecting dimension of the projecting end of the covering portion 36, i.e. a projecting dimension of the covering portion 36 to an upper end, from the upper surface of the connector housing 20. That is, the operation surface 28 is at a position higher than the upper end of the covering portion 36. Also when a resilient displacement amount of the lock arm 25 toward the connector housing 20 is maximum as shown in FIG. 5, the operation surface 28 is at a position higher than the upper end of the covering portion 36. When the resilient displacement amount of the lock arm 25 is maximum, the operating portion 27 is in contact with a rear end part of the upper surface of the outer plate portion 32 of the connector housing 20.

The inner housing 31 is integrally formed with a pair of bilaterally symmetrical protrusions 37 having a rectangular parallelepiped shape. The protrusions 37 are arranged on a rear end part of the upper surface of the outer plate portion 32. The pair of protrusions 37 are arranged to sandwich the covering portion 36 from both left and right sides. End parts on the side of the covering portion 36, out of both end parts in the width direction of the protrusions 37, are directly connected to both left and right end edges of the covering portion 36. The rear surfaces of the protrusions 37 are connected flush with the rear surface of the covering portion 36 and the rear end surface of the outer plate portion 32.

As shown in FIGS. 2, 4 and 5, the outer surface of the inner housing 31 is formed with a recess 38 by shallowly recessing the outer surface of the outer plate portion 32. A formation region of the recess 38 in the lateral direction is in the same range as the lock arm 25 and the deflection allowance space 30. The recess 38 constitutes a part of the deflection allowance space 30.

The outer housing 40 is a single component including a closing plate portion 41 having a rectangular plan view shape when the outer housing 40 is viewed from above, the front wall portion 22, a pair of left and right side wall portions 42 and the lock arm 25. The front wall portion 22 is shaped to project upward from the front end edge of the closing plate portion 41 over an entire width. The side wall portions 42 are shaped to project upward from both left and right side edge parts of the closing plate portion 41. Guide grooves 43 extending in the front-rear direction are formed in the inner side surfaces of the side wall portions 42. The lock arm 25 is cantilevered rearward from a widthwise central part of the front wall portion 22.

Next, an assembling procedure of the connector A is described. First, the inner housing 31 is vertically inverted, and the terminal fittings 10 are accommodated into the terminal accommodation chambers 21 through the openings 34. A mounting direction of the terminal fitting 10 into the terminal accommodation chamber 21 is a direction intersecting perpendicular to the front-rear direction, in which the terminal fitting 10 and the wire 14 are arranged, i.e. a length direction of the terminal fitting 10. If the terminal fitting 10 accommodated into the terminal accommodation chamber 21 is slid rearward, the retaining portion 35 locks a rear end part of the terminal body portion 11 while being inserted thereinto. By this locking, the terminal fitting 10 is restricted from relatively moving rearward, i.e. toward the wire 14, with respect to the inner housing 31.

After the terminal fittings 10 are mounted into the inner housing 31, the outer housing 40 and the inner housing 31 are assembled to configure the connector housing 20. When the inner housing 31 and the outer housing 40 are assembled, both left and right side edge parts of the inner housing 31 are fit into the guide grooves 43 from behind the outer housing 40 and slid. The outer housing 40 is assembled while being vertically sandwiched between the closing plate portion 41 and the lock arm 25.

With the inner housing 31 and the outer housing 40 assembled, all the openings 34 of the inner housing 31 are closed by the closing plate portion 41 and the terminal accommodation chambers 21 are defined over the entire peripheries. The terminal fittings 10 are held accommodated in the terminal accommodation chambers 21. The wires 14 are led out rearward from the connector housing 20.

The lock arm 25 is arranged to overlap the outer surface of the outer plate portion 32. The front end part of the inner housing 31 is sandwiched in the vertical direction between the supporting portion 26 of the lock arm 25 and the closing plate portion 41. The lock arm 25 is arranged to cover the deflection allowance space 30 and the recess 38 in the front-rear direction and lateral direction. Out of the outer surface of the outer plate portion 32, regions not overlapping the lock arm 25 and side edge regions not to be fit into the guide grooves 43 are exposed on the outer surface of the connector housing 20.

The operating portion 27 is located obliquely upward and forward of the covering portion 36. In the front-rear direction, the entire operating portion 27 is located forward of the covering portion 36. In the vertical direction, i.e. a direction parallel to a resilient displacement direction of the lock arm 25, an upper end part of the operating portion 27 is located higher than the covering portion 36. In the vertical direction, the entire operating portion 27 is arranged at a position lower than the upper ends of the protrusions 37. In the above way, the assembling of the connector housing 20, the mounting of the terminal fittings 10 into the connector housing 20 and the manufacturing of the connector A are completed.

In connecting the connector A to the mating connector 50, the connector housing 20 is fit into the receptacle 51 of the mating connector 50. In the process of fitting the connector housing 20 and the receptacle 51, the lock arm 25 is resiliently displaced in a direction approaching the outer plate portion 32 due to interference with the lock projection 52. At this time, a part of the lock arm 25 enters the deflection allowance space 30 and the recess 38. When the connector housing 20 and the receptacle 51 are properly fit, the lock arm 25 resiliently returns and the lock hole 29 and the lock projection 52 are fit. By the fitting of the lock hole 29 and the lock projection 52, the connector housing 20 and the mating connector 50 are locked in the connected state.

The connector A of the first embodiment is provided with the connector housing 20 and the lock arm 25 shaped to extend rearward along the outer surface of the connector housing 20. The deflection allowance space 30 is formed between the outer surface of the connector housing 20 and the lock arm 25. The deflection allowance space 30 is a space for enabling the lock arm 25 to be resiliently displaced in the direction approaching the outer surface of the connector housing 20. The connector housing 20 is formed with the covering portion 36 for covering the lock arm 25 from behind by projecting from the outer surface of the connector housing 20.

According to the connector A of the first embodiment, it can be prevented by the covering portion 36 that an external matter is stuck in the deflection allowance space 30 between the outer surface of the connector housing 20 and the lock arm 25. The covering portion 36 is arranged not to cover the outer surface of the lock arm 25, but to cover the deflection allowance space 30 from behind the lock arm 25. Thus, the connector housing 30 does not become bulky. Therefore, according to the connector A of the first embodiment, it can be prevented that a resilient displacement of the lock arm 25 is hindered while a height reduction is achieved.

The operating portion 27 is formed on the rear end part of the lock arm 25. The covering portion 36 is arranged behind and side by side with the operating portion 27. Accordingly, when the lock arm 25 is resiliently displaced into the deflection allowance space 30 by pushing the operation surface 28 of the operating portion 27, the operating portion 27 does not interfere with the covering portion 36. When the resilient displacement amount of the lock arm 25 is maximum, the operation surface 28 of the operating portion 27 is located further in a projecting direction than the projecting end of the covering portion 36. That is, the operation surface 28 is at a position higher than the upper end of the covering portion 36. Therefore, when the operation surface 28 of the operating portion 27 is pushed, the covering portion 36 does not obstruct the operation. Further, since the covering portion 36 is constantly at a position lower than the operation surface 28, enlargement in the vertical direction due to the formation of the covering portion 36 is avoided.

The protrusions 37 arranged to sandwich the operating portion 27 on the rear end part of the lock arm 25 in the lateral direction are formed on the outer surface of the connector housing 20. According to this configuration, the intrusion of an external matter into the deflection allowance space 30 from the lateral direction can be prevented by the protrusions 37. Since the covering portion 36 is plate-like, there is a concern over strength and rigidity. However, since the both left and right end parts of the covering portion 36 are directly connected to the protrusions 37, the strength of the covering portion 36 is enhanced. Therefore, even if a worker's finger contacts the covering portion 36 in unlocking the lock arm 25 by pushing the operation surface 28, the deformation of the covering portion 36 can be prevented.

As shown in FIGS. 2, 4 and 5, the outer plate portion 32 constituting the outer surface of the connector housing 20 is formed with the recess 38 constituting a part of the deflection allowance space 30. According to this configuration, since a part of the deflection allowance space 30 necessary for the resilient displacement of the lock arm 25 is secured within a thickness range of the outer plate portion 32 of the connector housing 20, a height reduction can be realized. Out of the outer plate portion 32, the regions not overlapping the lock arm 25 are exposed on the outer surface of the connector housing 20. According to this configuration, since no plate portion constituting the outer housing 40 is interposed between the outer surface of the outer plate portion 32 and the lock arm 25, a height reduction can be realized.

The connector housing 20 is configured by assembling the inner housing 31 and the outer housing 40. The inner housing 31 is formed with the terminal accommodation chambers 21 for accommodating the terminal fittings 10. The outer housing 40 closes the openings 34 of the terminal accommodation chambers 21 in the outer surface of the inner housing 31. The outer housing 40 is integrally formed with the lock arm 25. The inner housing 31 is integrally formed with the covering portion 36. That is, the lock arm 25 and the covering portion 36 are separately formed on the outer housing 40 and the inner housing 31, which are mutually different components. In this way, the structures of a mold for the outer housing 40 and a mold for the inner housing 31 are simplified. Further, a degree of freedom in designing the lock arm 25 and the covering portion 36 is high.

The inner housing 31 includes the outer plate portion 32 constituting the outer surface of the connector housing 20 and the separation wall portions 33 projecting from the outer plate portion 32 and partitioning between adjacent ones of the terminal accommodation chambers 21. The outer housing 40 includes the closing plate portion 41 for closing the openings 34 of the terminal accommodation chambers 21. The lock arm 25 is arranged to overlap the outer surface of the outer plate portion 32 and sandwich the inner housing 31 between the closing plate portion 41 and the lock arm 25. According to this configuration, since the inner housing 31 is sandwiched between the closing plate portion 41 and the lock arm 25, the inner housing 31 and the outer housing 40 can be prevented from being relatively displaced away from each other in the vertical direction.

Second Embodiment

Figure 7:
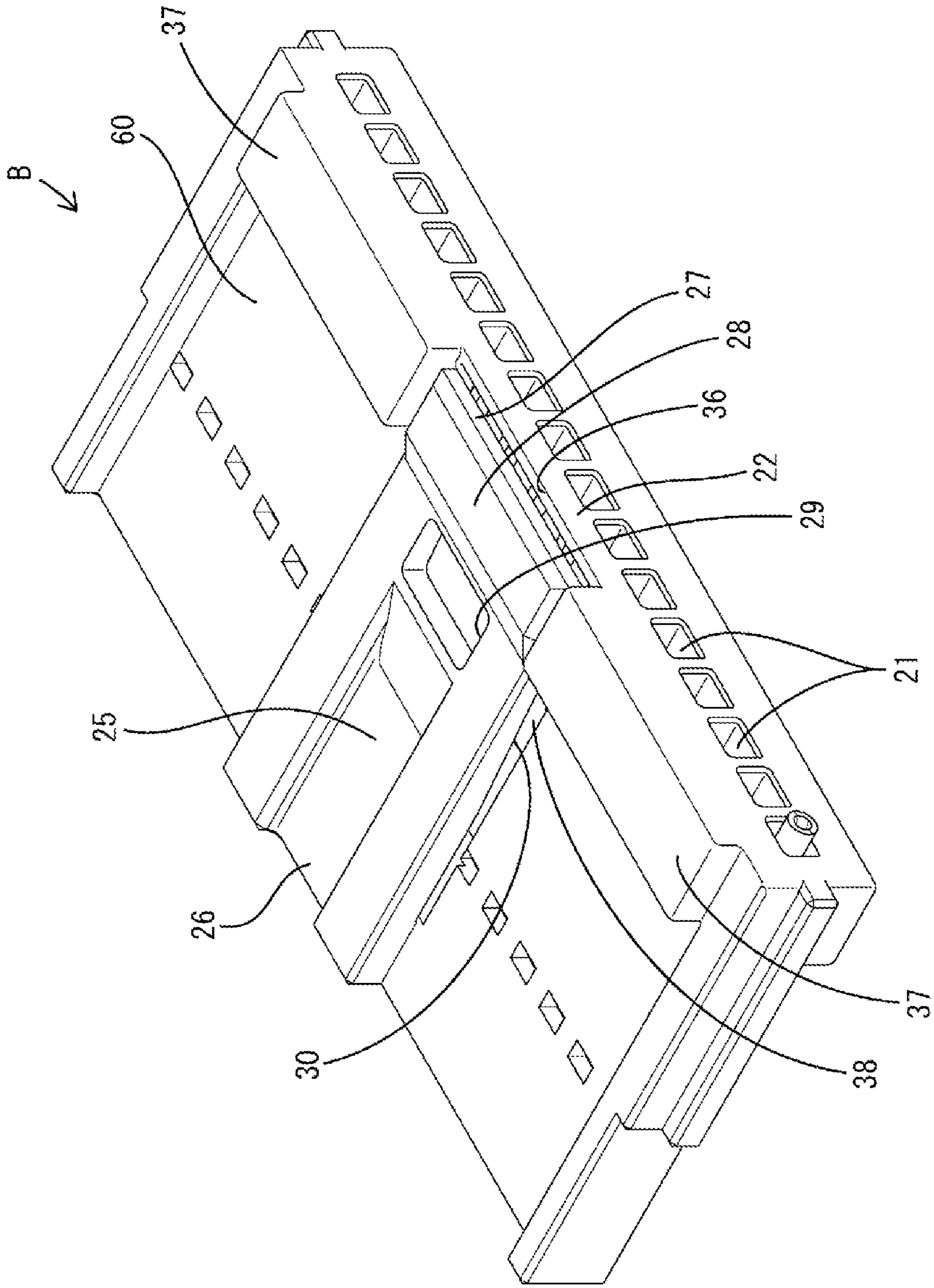
FIG. 7 is a perspective view of a connector of a second embodiment.

A second specific embodiment of the present disclosure is described with reference to FIG. 7. The connector housing 20 of the first embodiment is configured by assembling the inner housing 31 and the outer housing 40, whereas a connector housing 60 is a single component in a connector B of the second embodiment. The connector housing 60 is integrally formed with a lock arm 25 and a covering portion 36. Since the other components are the same as in the first embodiment, the same components are denoted by the same reference signs and the structures, functions and effects thereof are not described.

Other Embodiments

The present invention is not limited to the above described and illustrated embodiments, but is represented by claims. The present invention is intended to include all changes in the scope of claims and in the meaning and scope of equivalents and also include the following embodiments.

Although the operation surface of the operating portion is located further in the projecting direction than the projecting end of the covering portion when the resilient displacement amount of the lock arm is maximum in the above embodiments, the operation surface of the operating portion may be at the same height as or at a position lower than the projecting end of the covering portion.

Although the protrusions and the covering portion are directly connected in the above embodiments, gaps may be present between the protrusions and the covering portion.

Although the protrusions are arranged to sandwich the rear end part of the lock arm in the lateral direction in the above embodiments, the protrusions may not be arranged to sandwich the rear end part of the lock arm in the lateral direction.

Although the outer plate portion of the connector housing is formed with the recess constituting a part of the deflection allowance space in the above embodiments, the outer plate portion of the connector housing may be shaped not to include the recess.

LIST OF REFERENCE NUMERALS

A . . . connector
B . . . connector
10 . . . terminal fitting
11 . . . terminal body portion
12 . . . resilient contact piece
13 . . . crimping portion
14 . . . wire
20 . . . connector housing
21 . . . terminal accommodation chamber
22 . . . front wall portion
23 . . . insertion hole
25 . . . lock arm
26 . . . supporting portion
27 . . . operating portion
28 . . . operation surface
29 . . . lock hole
30 . . . deflection allowance space
31 . . . inner housing
32 . . . outer plate portion
33 . . . separation wall portion
34 . . . opening
35 . . . retaining portion
36 . . . covering portion
37 . . . protrusion
38 . . . recess
40 . . . outer housing
41 . . . closing plate portion
42 . . . side wall portion
43 . . . guide groove
50 . . . mating connector
51 . . . receptacle
52 . . . lock projection
53 . . . male termina
54 . . . tab
60 . . . connector housing

What is claimed is:

1. A connector, comprising:
a connector housing; and
a lock arm shaped to extend rearward along an outer surface of the connector housing,
a deflection allowance space for enabling the lock arm to be resiliently displaced in a direction approaching the outer surface of the connector housing being provided between the outer surface of the connector housing and the lock arm, and
the connector housing being formed with a covering portion for covering the lock arm from behind by projecting from the outer surface of the connector housing,
wherein:
the connector housing is configured by assembling an inner housing formed with a terminal accommodation chamber for accommodating a terminal fitting and an outer housing for closing an opening of the terminal accommodation chamber in an outer surface of the inner housing,
the lock arm is formed on the outer housing, and
the covering portion is formed on the inner housing,
wherein:
the inner housing includes an outer plate portion constituting the outer surface of the connector housing and a separation wall portion projecting from the outer plate portion and partitioning between adjacent ones of the terminal accommodation chambers,
the outer housing includes a closing plate portion for closing the openings of the terminal accommodation chambers, and
the lock arm is arranged to overlap an outer surface of the outer plate portion and sandwich the inner housing between the closing plate portion and the lock arm.

2. The connector of claim 1, wherein:
an operating portion is formed on a rear end part of the lock arm, and
an operation surface of the operating portion is located further in a projecting direction than a projecting end of the covering portion when a resilient displacement amount of the lock arm is maximum.

3. The connector of claim 1, wherein an outer plate portion constituting the outer surface of the connector housing is formed with a recess constituting a part of the deflection allowance space.

4. The connector of claim 1, wherein a region not overlapping the lock arm, out of the outer plate portion, is exposed on the outer surface of the connector housing.

5. The connector of claim 1, wherein protrusions arranged to sandwich a rear end part of the lock arm in a lateral direction are formed on the outer surface of the connector housing.

6. The connector of claim 5, wherein the protrusions and the covering portion are directly connected.

* * * * *